United States Patent
Ooi et al.

(10) Patent No.: US 9,449,602 B2
(45) Date of Patent: Sep. 20, 2016

(54) DUAL UPLINK PRE-PROCESSING PATHS FOR MACHINE AND HUMAN LISTENING

(71) Applicant: GOOGLE INC., Mountain View, CA (US)

(72) Inventors: Leng Ooi, San Jose, CA (US); Aaron Matthew Eash, San Francisco, CA (US); Dylan Reid, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/095,181

(22) Filed: Dec. 3, 2013

(65) Prior Publication Data

US 2015/0154964 A1  Jun. 4, 2015

(51) Int. Cl.
| | |
|---|---|
| G10L 15/30 | (2013.01) |
| G10L 19/02 | (2013.01) |
| G10L 19/26 | (2013.01) |
| G10L 21/02 | (2013.01) |
| G10L 19/008 | (2013.01) |

(52) U.S. Cl.
CPC ............ *G10L 19/008* (2013.01); *G10L 15/30* (2013.01); *G10L 19/26* (2013.01); *G10L 21/02* (2013.01); *G10L 19/02* (2013.01)

(58) Field of Classification Search
CPC ....... G10L 15/00; G10L 15/30; G10L 19/00; G10L 19/02; G10L 19/26; G10L 19/265; G10L 21/02
USPC ...................... 704/200, 251, 270.1, 275, 500
See application file for complete search history.

(56) References Cited

U.S. PATENT DOCUMENTS

| | | | | |
|---|---|---|---|---|
| 4,737,976 A | * | 4/1988 | Borth et al. .................. | 455/563 |
| 5,459,792 A | * | 10/1995 | Reichel et al. ............... | 381/111 |
| 5,855,003 A | * | 12/1998 | Ladden et al. ................ | 704/270 |
| 6,223,161 B1 | * | 4/2001 | Schliwa ....................... | 704/275 |
| 6,502,070 B1 | * | 12/2002 | Boies et al. .................. | 704/224 |
| 6,532,446 B1 | * | 3/2003 | King ........................... | 704/270.1 |
| 6,801,604 B2 | | 10/2004 | Maes et al. | |
| 6,868,385 B1 | * | 3/2005 | Gerson ........................ | 704/275 |

(Continued)

FOREIGN PATENT DOCUMENTS

KR  WO 2008001991 A1 *  1/2008  ............. G10L 15/30

OTHER PUBLICATIONS

Scalart, Pascal et al. "Speech enhancement based on a priori signal to noise estimation." Acoustics, Speech, and Signal Processing, 1996. ICASSP-96. Conference Proceedings., 1996 IEEE International Conference on. vol. 2. IEEE, May 1996, pp. 629-632.*

(Continued)

*Primary Examiner* — James Wozniak
(74) *Attorney, Agent, or Firm* — Brake Hughes Bellermann LLP

(57) ABSTRACT

In some implementations, a device for providing dual uplink processing paths may include a human listening (HL) input processing unit configured to receive an audio stream and pre-process the audio stream to create a first audio signal adapted for human listening via a first uplink processing path, a machine listening (ML) input processing unit configured to receive the audio stream and pre-process the audio stream to create a second audio signal adapted for machine listening via a second uplink processing path, and a network interface unit configured to transmit the first audio signal via the first uplink processing path and transmit the second audio signal via the second uplink processing path to a remote server.

19 Claims, 6 Drawing Sheets

(56) References Cited

U.S. PATENT DOCUMENTS

| | | | |
|---|---|---|---|
| 7,742,592 B2 | 6/2010 | Faller | |
| 8,559,603 B2* | 10/2013 | Seo | 379/88.01 |
| 8,618,958 B2* | 12/2013 | Taniguchi et al. | 340/995.23 |
| 2002/0077814 A1* | 6/2002 | Garudadri et al. | 704/246 |
| 2002/0147579 A1* | 10/2002 | Kushner et al. | 704/207 |
| 2003/0021394 A1* | 1/2003 | Krack | 379/88.01 |
| 2003/0110042 A1* | 6/2003 | Stanford | 704/500 |
| 2003/0191646 A1* | 10/2003 | D'Avello et al. | 704/270 |
| 2004/0192396 A1* | 9/2004 | Fournier | 455/563 |
| 2005/0065779 A1* | 3/2005 | Odinak | 704/201 |
| 2005/0132420 A1* | 6/2005 | Howard et al. | 725/135 |
| 2005/0159957 A1* | 7/2005 | Roth et al. | 704/276 |
| 2006/0053011 A1* | 3/2006 | Kim | G10L 15/26 704/236 |
| 2007/0032246 A1* | 2/2007 | Feher | H04W 64/00 455/456.1 |
| 2007/0112571 A1* | 5/2007 | Thirugnana | 704/270 |
| 2007/0143105 A1* | 6/2007 | Braho et al. | 704/231 |
| 2008/0077406 A1* | 3/2008 | Ganong, III | G10L 15/22 704/251 |
| 2008/0107100 A1* | 5/2008 | Begeja et al. | 370/352 |
| 2008/0255850 A1* | 10/2008 | Cross | G10L 15/22 704/275 |
| 2008/0300025 A1* | 12/2008 | Song et al. | 455/569.1 |
| 2010/0151788 A1* | 6/2010 | Rahman | H04M 1/6066 455/41.2 |
| 2011/0151825 A1* | 6/2011 | Mathis et al. | 455/404.1 |
| 2012/0004909 A1* | 1/2012 | Beltman et al. | 704/233 |
| 2012/0078397 A1* | 3/2012 | Lee et al. | 700/94 |
| 2012/0166186 A1* | 6/2012 | Acero et al. | 704/205 |
| 2013/0303133 A1* | 11/2013 | Sansalone | 455/414.1 |
| 2014/0211965 A1* | 7/2014 | Hetherington | G10L 21/0208 381/94.2 |

OTHER PUBLICATIONS

International Search Report and Written Opinion from corresponding application PCT/US2014/065405, dated Mar. 31, 2015, 9 pages.

* cited by examiner

DUAL UPLINK PRE-PROCESSING PATHS FOR MACHINE AND HUMAN LISTENING

TECHNICAL FIELD

This description relates to multi-path audio processing, and, in particular, to a computing device having dual signal paths that are turned for both human and machine listening.

BACKGROUND

A person may interact with a computing device with audio information in several different ways. In some examples, a person may provide a voice command to the computing device so that the computing device may take the appropriate action specified by the voice command. Also, the computing device may receive speech from a user and translate this speech to text. These types of audio signals may be considered audio signals for machine listening. For example, a speech-to-text converter and/or a voice command interpreter may receive the audio signals and process them in order to create text or machine instructions according to the audio signals.

In other examples, a person may provide audio information to the computing device for purposes of communicating with another person. For example, the user may engage in a telephone call, audio chat, video conference, etc. with another person. As such, the computing device may transmit an audio signal that captures the received speech through a network so that another person may listen to the audio signal. These types of audio signals may be considered audio signals for human listening.

However, before processing or transmitting the audio signal, the computing device may perform pre-processing on the audio signal to remove undesirable components of the audio signal such as noise, for example. Typical, pre-processing of audio signals may include noise reduction, noise suppression, echo removal, etc. However, algorithms used for pre-processing of the audio signal generally represent compromises between algorithms that are optimally tuned for processing audio signals for later human listening and algorithms that are tuned for machine listening, such that the algorithm is not optimized for either final use.

SUMMARY

In some implementations, a device for providing dual uplink processing paths may include a human listening (HL) input processing unit configured to receive an audio stream and pre-process the audio stream to create a first audio signal adapted for human listening via a first uplink processing path, a machine listening (ML) input processing unit configured to receive the audio stream and pre-process the audio stream to create a second audio signal adapted for machine listening via a second uplink processing path, and a network interface unit configured to transmit the first audio signal via the first uplink processing path and transmit the second audio signal via the second uplink processing path to a remote server.

In some implementations, the first audio signal is transmitted at a same time as the second audio signal. The HL input processing unit may include a HL compression unit configured to compress the audio stream to create the first audio signal having a non-linear range, and the ML input processing unit may include a ML compression unit configured to compress the audio stream to create the second audio signal with a linear range. The HL input processing unit may include a HL noise unit configured to insert at least one artifact to the first audio signal, and the ML input processing unit may include a ML noise unit configured to not insert the at least one artifact to the second audio signal. Also, the device may include at least one microphone configured to receive the audio stream, and provide the audio stream to the HL input processing unit and the ML input processing unit.

In some implementations, a method for providing dual pre-processing paths may include pre-processing, by a device, an audio stream to create a first audio signal adapted for human listening via a first uplink processing path, pre-processing, by the device, the audio stream to create a second audio signal adapted for machine listening via a second uplink processing path, and transmitting, by the device, the first audio signal via the first uplink processing path and the second audio signal along the second uplink processing path to a remote server.

In some implementations, the first audio signal is transmitted at a same time as the second audio signal. The pre-processing the audio stream to create the first audio signal adapted for human listening may include compressing the audio stream to create the first audio signal having a non-linear range, and the pre-processing the audio stream to create the second audio signal adapted for machine listening may include compressing the audio stream to create the second audio signal with a linear range. The pre-processing the audio stream to create the first audio signal adapted for human listening further may include inserting at least one artifact to the first audio signal, and the pre-processing the audio stream to create the second audio signal adapted for machine listening may further include not inserting the at least one artifact to the second audio signal.

In some implementations, a non-transitory computer-readable medium storing instructions, when executed by at least one semi-conductor processor, are configured to pre-process an audio stream to create a first audio signal adapted for human listening via a first uplink processing path, pre-process the audio stream to create a second audio signal adapted for machine listening via a second uplink processing path, transmit the first audio signal via the first uplink processing path, and transmit the second audio signal along the second uplink processing path.

In some implementations, the first audio signal is transmitted at a same time as the second audio signal. The instructions to pre-process the audio stream to create the first audio signal adapted for human listening may include instructions to compress the audio stream to create the first audio signal having a non-linear range, and the instructions to pre-process the audio stream to create the second audio signal adapted for machine listening may include instructions to compress the audio stream to create the second audio signal having a linear range. The instructions to pre-process the audio stream to create the first audio signal adapted for human listening may further include instructions to insert at least one artifact to the first audio signal, and the instructions to pre-process the audio stream to create the second audio signal adapted for machine listening may further include instructions to not insert the at least one artifact to the second audio signal.

In some implementations, a server may include at least one semi-conductor processor, and a non-transitory computer-readable medium storing instructions, when executed by the at least one semi-conductor processor, are configured to implement a network interface unit configured to receive a first audio signal via a first uplink processing path from a device and receive a second audio signal via a second uplink processing path from the device, where the first audio signal has been pre-processed to be adapted for human listening, and the second audio signal has been pre-processed to be adapted for machine listening, a human listening component including a voice application configured to process and provide the first audio signal for listening by a human user, and a machine listening component configured to perform machine processing on the second audio signal.

In some implementations, the machine listening component may include a speech-to-text converter configured to convert the second audio signal to text. The machine listening component may include a voice command interpreter configured to convert the second audio signal to a machine command for performing at least one action by the device. The voice command interpreter may be configured to convert the second audio signal while the voice application is active. The first audio signal may be received at a same time as the second audio signal.

In some implementations, a method for dual uplink processing paths may include receiving a first audio signal via a first uplink processing path from a device, receiving a second audio signal via a second uplink processing path from the device, where the first audio signal has been pre-processed to be adapted for human listening, and the second audio signal has been pre-processed to be adapted for machine listening, processing the first audio signal for listening by a human user, and performing machine processing on the second audio signal.

In some implementations, the machine processing may include converting the second audio signal to a machine command for performing at least one action by the device while actively processing the first audio signal.

The details of one or more implementations are set forth in the accompa-nying drawings and the description below. Other features will be apparent from the description and drawings, and from the claims.

DETAILED DESCRIPTION

Figure 1A:
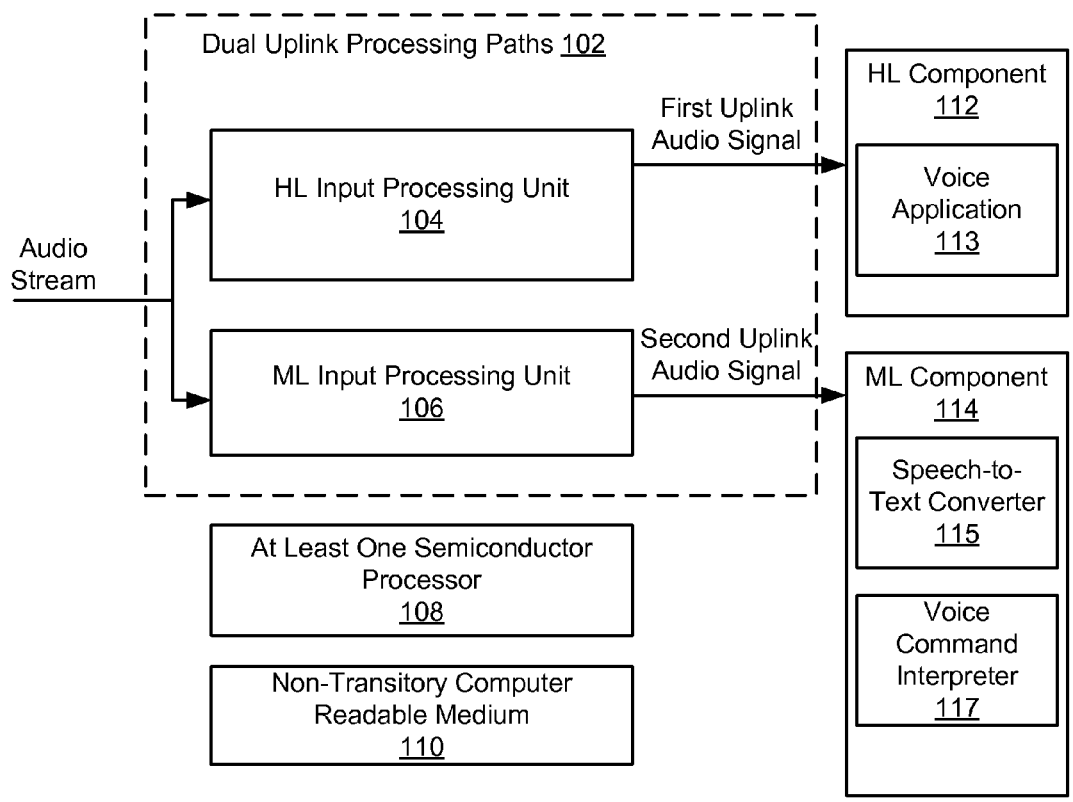
FIG. 1A illustrates a system for providing dual pre-processing paths for creating a first audio signal that is adapted for human listening and a second audio signal that is adapted for machine listening.

This document describes systems and techniques for providing dual-parallel uplink signal paths such that a device may process and upload a first audio signal that is specifically tuned for human listening via a first uplink processing path and process and upload a second audio signal that is specifically tuned for machine listening via a second uplink processing path. For example, audio data to be uploaded to a remote server for further processing may be pre-processed within an uplink processing path after that audio data is captured by one or more microphones. Generally, uplink audio processing includes pre-processing (e.g., noise suppression techniques), and applying compression techniques, as well as preparing the audio signal for transmission though a network. As further described below, the systems and techniques may perform uplink pre-processing on an audio signal that adapts the signal to human listening and may concurrently perform uplink processing on the audio signal that adapts the signal to machine listening via a separate uplink processing path. Then, both these audio signals may be uploaded or transmitted to the remote server for further human and machine processing via their respective uplink processing paths.

The systems and techniques may perform uplink pre-processing using a first algorithm that is specifically turned for machine listening and perform uplink pre-processing on the audio signal using a second algorithm that is specifically turned for human listening. Then, both these pre-processed audio signals may be compressed and then uploaded to a remote server for machine and/or human processing. For example, when pre-processing the audio signal for human listening, the device may apply compression and noise suppression techniques in a manner that may insert artifacts within the audio signal to make it properly tuned for human listening. However, these artifacts may make machine listening relatively more difficult. For example, an audio signal that has been properly tuned for only human listening may not be well suited for machine listening. Therefore, in conjunction with processing the audio signal for human listening, the device may also apply separate compression and noise suppression techniques in a manner that makes the audio signal properly tuned for machine listening. As a result, the device may produce a first audio signal that is adapted for human listening and a second audio signal that is adapted for machine listening.

In this manner, the traditional technique of uplink pre-processing the audio signal that is a compromise between machine listening and human listening is avoided, thereby improving the quality of the audio signal for both machine listening and human listening. Further, this dual-path architecture permits a machine listening component to continuously capture voice commands while the human speaker is talking on another application for human listening. These and other features are further explained with reference to the figures.

FIG. 1A illustrates a system 100 for providing dual uplink processing paths 102 for creating and communicating a first uplink audio signal that is adapted for human listening and for creating and communicating a second uplink audio signal that is adapted for machine listening according to an embodiment. In one general aspect, the dual uplink processing paths 102 may include a first uplink processing path having a human listening (HL) input processing unit 104 and a second uplink processing path having a machine listening (ML) input processing unit 106. For example, the dual uplink processing paths 102 may include two separate and parallel uplink processing paths. One of the uplink processing paths may include the HL input processing unit 104, and the other uplink processing path may include the ML input processing unit 106.

The system 100 may also include at least one semi-conductor processor 108, a non-transitory computer readable medium 110, human listening (HL) component(s) 112, and machine listening (ML) component(s) 114. As further explained later in the document, the dual uplink processing paths 102 may be considered two separate uplink processing paths for processing and then communicating the resulting signals to a remote server having the HL component 112 and the ML component 114.

The non-transitory computer readable medium 110 may include instructions, that when executed by the at least one semi-conductor processor 108, are configured to implement the components and/or functionalities of the system 100. Further, the system 100 may include other components or units known to one of ordinary skill in the art.

The non-transitory computer readable medium 110 may include one or more non-volatile memories, including, by way of example, semiconductor memory devices, e.g., EPROM, EEPROM, and flash memory devices; magnetic disks, e.g., internal hard disks or removable disks, magneto optical disks, and CD ROM and DVD-ROM disks. The at least one semi-conductor processor 108 may include any type of general purpose computing circuitry or special purpose logic circuitry, e.g., an FPGA (field programmable gate array) or an ASIC (application specific integrated circuit). Also, the semi-conductor processor 108 may be considered a processor that is configured to be coupled to a substrate.

The HL component 112 may include one or more components that use audio signals for human listening. The HL component 112 may include software or hardware (or a combination of both) that relays the speech of the audio stream to another user for human listening via another device. The HL component 112 may include any type of application, module, unit, component, or circuit, which provides the speech of the audio stream to another human user via another device over a network. In some example, the HL component 112 may include a voice application 113 that receives and provides audio signals over a network for listening by a human user. The voice application 113 may be any type of application used for talking/listening on the phone, audio/video teleconferences, or generally any type of application for transmitting/receiving audio signals to/from another person via a network. In some examples, the network may be any type of wireless or computer network such as 3G, 4G, LTE, Wi-Fi, internet, and/or intranet.

The ML component 114 may include one or more components that use audio signals for machine listening. The ML component 114 may be software or hardware (or a combination of both) that extracts meaningful information from the audio stream. In other words, the ML component 114 may receive and interpret the audio stream to be used for further device processing such as speech recognition for speech-to-text conversion and/or voice command interpretation, for example.

Generally, the ML component 114 may include any type of application, module, unit, component, or circuit, which can listen to and process audio signals that are used for machine processing (e.g., not human listening). In some examples, the ML component 114 may include a speech-to-text converter 115 and/or a voice command interpreter 117. The speech-to-text converter 115 may receive audio signals containing speech, and then convert the speech to text. The voice command interpreter 117 may receive audio signals containing voice commands, and then generate one or more machine commands to instruct the device to perform one or more actions. In one specific example, the voice command interpreter 117 may receive a voice command from a human user to send an email to another person, which the voice command interpreter 117 may respond to by generating a machine instruction for the device to open an email application directed to the specific person. However, the voice command interpreter 117 may receive and interpret any type of voice commands directed to a wide range of actions to be performed by the device. In some embodiments, the ML component 114 and the HL component 114 may be components or applications residing on one or more remote servers that receive and further process uplink audio data.

In some embodiments, the components of the system 100 such as the dual uplink processing paths 102, the at least one semi-conductor processor 108, the non-transitory computer readable medium 110, the HL component(s) 112, and the ML component(s) 114 may be embodied within a single device or distributed across multiple devices within a networking environment. The multiple devices may include a user-operated device, network elements such as servers hosting one or more HL components 112 and/or ML components 114, as well as other user-operated device(s), which are connected within the network environment.

In some examples, the dual uplink processing paths 102 may be included with the user-operated device such as a phone, smartphone, personal computer, a tablet computer, a laptop or notebook computer, a gaming device, or a thin-client terminal that can connect to the networking environment. Also, the HL components 112 and the ML components 114 may be provided locally on the device. In other examples, the HL components 112 and the ML components 114 may be hosted on one or more servers remote from the user-operated device. For example, the user-operated device may include the dual uplink processing paths 102, but one or more of the ML components 114 and/or the HL components 112 may be provided on one or more remote servers. As such, the user-operated device may upload one or more of the first audio signals and/or the second audio signals for processing by the ML components 114 and/or the HL components 112 hosted on the one or more servers. In some examples, the user-operated device may upload both the first pre-processed audio signal and the second pre-processed audio signal to the one or more servers for further processing.

In one specific example, the user-operated device may upload the second audio signal adapted for machine listening to the speech-to-text converter 115, and thereafter receive the converted text over the network from the remote server. Also, the user-operated device may upload the second audio signal adapted for machine listening to the voice command interpreter 117, and thereafter receive the machine commands to perform the requested actions.

In other examples, the HL input processing unit 104 and the ML input processing unit 106 may be included within one or more servers remote from the user-operated device that receive the audio stream. For example, the server may receive the raw audio stream (before pre-processing) from the user-operated device via an uplink communication path, pre-process the audio stream to create the first and second audio signals, and then provide the appropriate signals to the appropriate HL components 112 and/or the ML components 114 located either on the user-operated device or the server itself.

Referring to FIG. 1A, the dual uplink processing paths 102 may provide a pre-processing path adapted for human listening and a separate pre-processing path adapted for machine listening for the uplink processing. In some embodiments, the dual uplink processing paths 102 may be parallel processing paths such that the device may process and transmit the first and second audio signals around the same time.

Each of the HL input processing unit 104 and the ML input processing unit 106 may receive the audio stream. In this context, the audio stream may represent the audio information before pre-processing is applied. The audio stream may represent one or more audio streams coming from the same source or multiple sources (e.g., one or more microphones located on the user-operated device). In this context, the audio stream may include speech components, and noise components such as background noise, or keyboard strokes. The audio stream may be electrically represented in either digital or analog format, and the following pre-processing steps may occur in either domain. Some examples of pre-processing may include active noise control (ANC), active noise reduction (ANR), acoustic echo canceller (AES), acoustic echo suppressor (AES), acoustic noise canceller (ANC), and/or noise suppressor (NS), among others.

The HL input processing unit 104 may include any type of pre-processing algorithm(s) such as the ANC, ANR, AES, ANC and/or NS. However, the pre-processing algorithm of the HL input processing unit 104 is specifically adapted or tuned for human listening. For example, the HL input processing unit 104 may pre-process the audio stream to create a first audio signal adapted for human listening. The first audio signal may be considered as one or more audio signals that have been pre-processed by the HL input processing unit 104. As such, the first audio signal may be specifically adapted or tuned for use within the HL components 112. The details of the pre-processing algorithm that is specifically tuned or adapted for human listening are further explained with reference to FIG. 1B.

The ML input processing unit 106 may include any type of pre-processing algorithm(s) as the ANC, ANR, AES, ANC and/or NS. However, the pre-processing algorithm of the ML input processing unit 106 is specifically adapted or tuned for machine listening—which is different than the pre-processing algorithm applied in the HL input processing unit 104. For example, the ML input processing unit 106 may pre-process the same audio stream to create a second audio signal adapted for machine listening. The second audio signal may be considered as one or more audio signals that have been pre-processed by the ML input processing unit 106. As such, the second audio signal may be specifically adapted or tuned for use within the ML components 114. The details of the pre-processing algorithm that is specifically tuned or adapted for machine listening are further explained with reference to FIG. 1B.

Referring to FIG. 1A, the HL input processing unit 104 may provide the first audio signal to the HL components 112, and the ML input processing unit 106 may provide the second audio signal to the ML components 114. In some examples, the user-operated device may upload the first audio signal and the second audio signal such that the HL components 112 and the ML components 114 of the server can receive and process the first audio signal and the second audio signal. In this context, the system 100 may apply any type of encoding/compression techniques or signal processing to adapt the first/second signals to the appropriate transmission protocols required by the networking environment of the system 100.

As explained above, in one embodiment, the ML component 114 may include the voice command interpreter 117, and the HL component 112 may include the voice application 113. The dual uplink processing paths 102 of the system 100 may permit the voice command interpreter 117 to capture voice commands while the user is actively using the voice application 113. For example, a user may be using the voice application 113 to communicate with another user. While the voice application 113 is active, the voice command interpreter 117 may interpret one or more second audio signals that have been specifically tuned for machine listening. In other words, the voice application 113 may process one or more first audio signals that have been tuned for human listening, while the voice command interpreter 117 may interpret one or more second audio signals that have been tuned for machine listening. It is noted that the voice application 113 and the voice command interpreter 117 are used are merely examples, where the dual uplink processing paths 102 may permit the processing of first audio signals by the HL component 112 while processing second audio signals by the ML component 114.

Figure 1B:
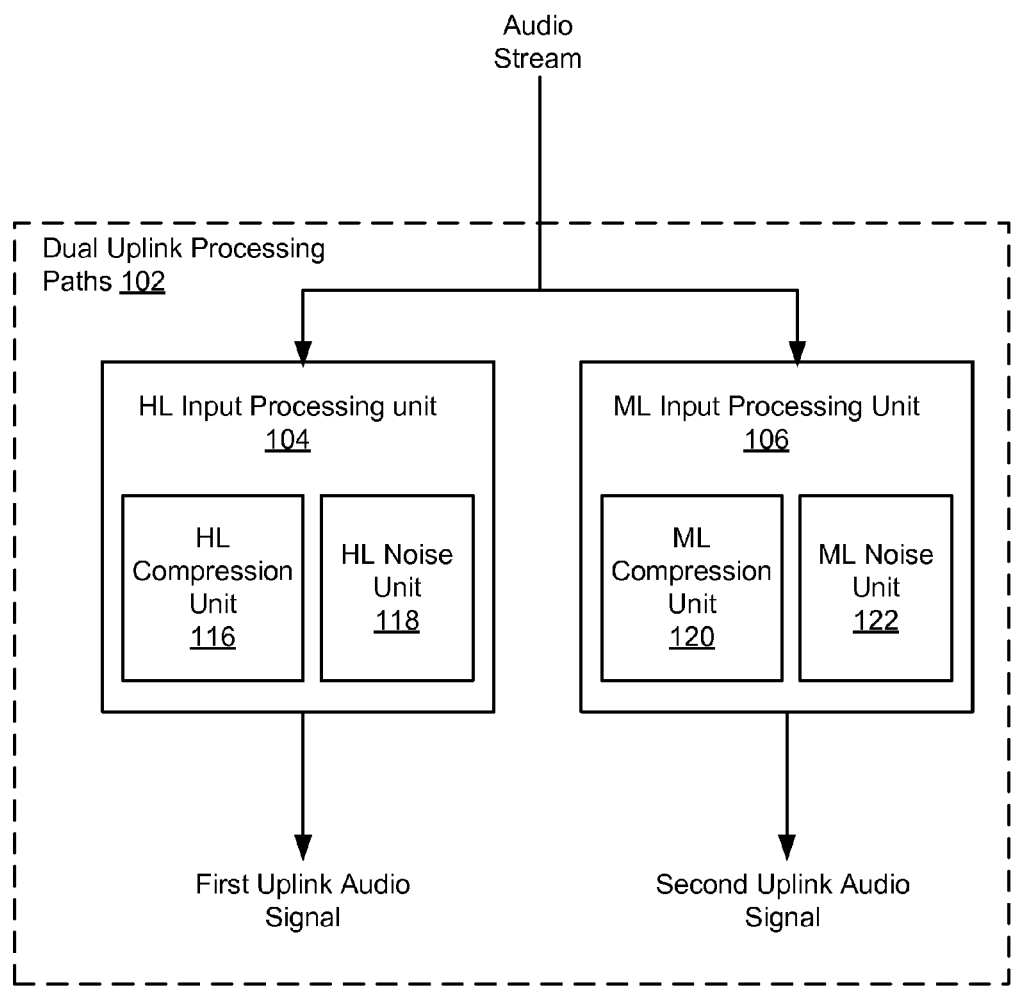
FIG. 1B illustrates a more detailed view of the dual pre-processing paths having an HL input processing unit and an ML input processing unit.

FIG. 1B illustrates a more detailed view of the dual uplink processing paths 102 having the HL input processing unit 104 and the ML input processing unit 106 according to an embodiment. As discussed above, each of the HL input processing unit 104 and the ML input processing unit 106 may receive the audio stream representing audio information from a user. The HL input processing unit 104 may apply pre-processing techniques that tune the audio stream for human listening, thereby creating the first audio signal. In a separate yet parallel uplink path, the ML input processing unit 106 may apply pre-processing techniques that tune the audio stream for machine listening, thereby creating the second audio signal. The second audio signal is a distinct audio signal from the first audio signal. For instance, the second audio signal may represent the same audio content as the first audio signal, but the second audio signal is specifically adapted or tuned for machine listening while the first audio signal is specifically adapted or tuned for human listening. Subsequent to applying the separate pre-processing algorithms, the first uplink audio signal and the second uplink audio signal may be compressed and prepared for transmission to the remote server.

The HL input processing unit 104 may include a human listening (HL) compression unit 116, and a human listening (HL) noise unit 118. The ML input processing unit 106 may include a machine listening (ML) compression unit 120 and a machine listening (ML) noise unit 122. In other words, the HL input processing unit 104 and the ML input processing unit 106 may include similar components, but each of these components are specifically tuned for machine listening or human listening. For example, the HL input processing unit 104 and the ML input processing unit 106 may apply compression techniques in different manners, and noise cancellation, reduction, and/or suppression techniques in different manners such that the audio stream is either optimized towards machine listening or human listening.

With respect to compression techniques, the HL compression unit 116 may compress the audio stream to create the first audio signal with a non-linear range such that the first audio signal can include soft and loud signal components. In other embodiments, the first audio signal may have a linear range and non-linear range. In other embodiments, the first audio signal may not have a linear range. For example, the HL compression unit 116 may compress the audio stream to create the first audio signal where at least a portion thereof includes a non-linear range so that the differences between loud and soft sounds may be reduced and the average sound level from the audio stream can be controlled.

Generally, a linear range may be the range of input/output signal ratio that conforms to a certain fix gain. In a non-limiting example of linearity, a first input signal of 1V may produce a first output signal of 2V, and a second input signal of 2V may produce a second output signal of 4V—this would conform to the gain of 2. In a non-limiting example of non-linearity, a first input signal of 1V may produce a first output signal of 2V, and a second input signal of 2V may produce a second output signal of 3V—this is non-linear because the gain changed between the first input signal and the second input signal.

In some implementations, the HL compression unit 116 may include a linear gain section and a non-linear gain section that is dependent on input levels. In a non-limiting example, for the voltage range of 1V-2V, the HL compression unit 116 may apply a gain of 2×. For the voltage range of 2V-3V, it may apply a gain of 1.5×. For the voltage range of 3V-4V, it may apply a gain of 1×. For the voltage range of 4V-5V, it may apply a gain of 0.5V. Within the voltage range, it may be considered linear, but between the difference ranges of 1V-5V, it may be non-linear.

Human listeners may benefit from non-linearity because it may reduce the difference between loud and soft sounds and permit the control of the average sound level from the audio stream. In contrast, machine listening algorithms may not tolerate non-linearity well. For instance, machine listeners tend to perform better when there is a certain range of linearity in the sound when the machine listener is processing the sound.

In some implementations, the ML compression unit 120 may compress the audio stream to create the second audio signal with a linear range. For example, a human listener does not require linearity in the audio signal to properly hear the speech. As such, the compression algorithm of the HL compression unit 116 may allow for both soft and loud components to sound similar in loudness. In contrast, a machine listener usually requires a certain linear range. For example, in one specific example, the ML component 114 may require 30 dB of linear region between signals levels to operate properly. As such, the ML compression unit 120 may apply compression more aggressively than what is applied in the HL compression unit 116.

With respect to noise cancellation, reduction, and/or suppression techniques, the HL noise unit 118 may allow, permit, or introduce one or more artifacts to the first audio signal. For example, human listeners are usually tolerant of artifacts introduced by noise suppression or cancellation techniques. In some examples, an artifact may be a piece of digital material which may occur during processing. In some examples, the artifacts may include hiss, clicks, pops, discontinuities, sudden drop in signal level, chirps, and/or cut off of tail-end or beginning of words, etc. For example, in a noisy environment, the algorithm may be tuned aggressively to remove background noise, while introducing perceived but acceptable artifacts to the first audio signal. In contrast, machine listeners are less tolerant to some of these artifacts. As such, the ML noise unit 122 may introduce artifacts, but the noise algorithm is tuned differently to not introduce artifacts to the second audio signal that will disrupt machine recognition algorithms.

In a further example, the background signal level (e.g., ambient, environmental sound) may change sound levels depending on whether the person is speaking or not speaking. In this example, the HL noise unit 118 may permit the signal level change because it is acceptable for a human listener. However, the ML noise unit 122 may tune the background signal level to be relatively constant. For example, machine listeners may tolerate some background noise, but they are less tolerant to sudden changes in the signal level.

In addition, noise may be more obvious when the bandwidth is reduced. For example, for a number of different reasons, the bandwidth of the audio stream may be reduced. In a specific example, the bandwidth may be reduced from 8 kHz to 4 kHz. However, the embodiments encompass any level of bandwidth drop. The human listeners can adapt to the drop in bandwidth. However, machine listeners may have a decrease in recognition accuracy when the bandwidth of the audio stream is dropped, e.g., dropped to 4 kHz, for example. As such, the HL noise unit 118 may apply a different noise algorithm response than the ML noise unit 122 when the bandwidth of the audio stream is decreased.

Figure 2:
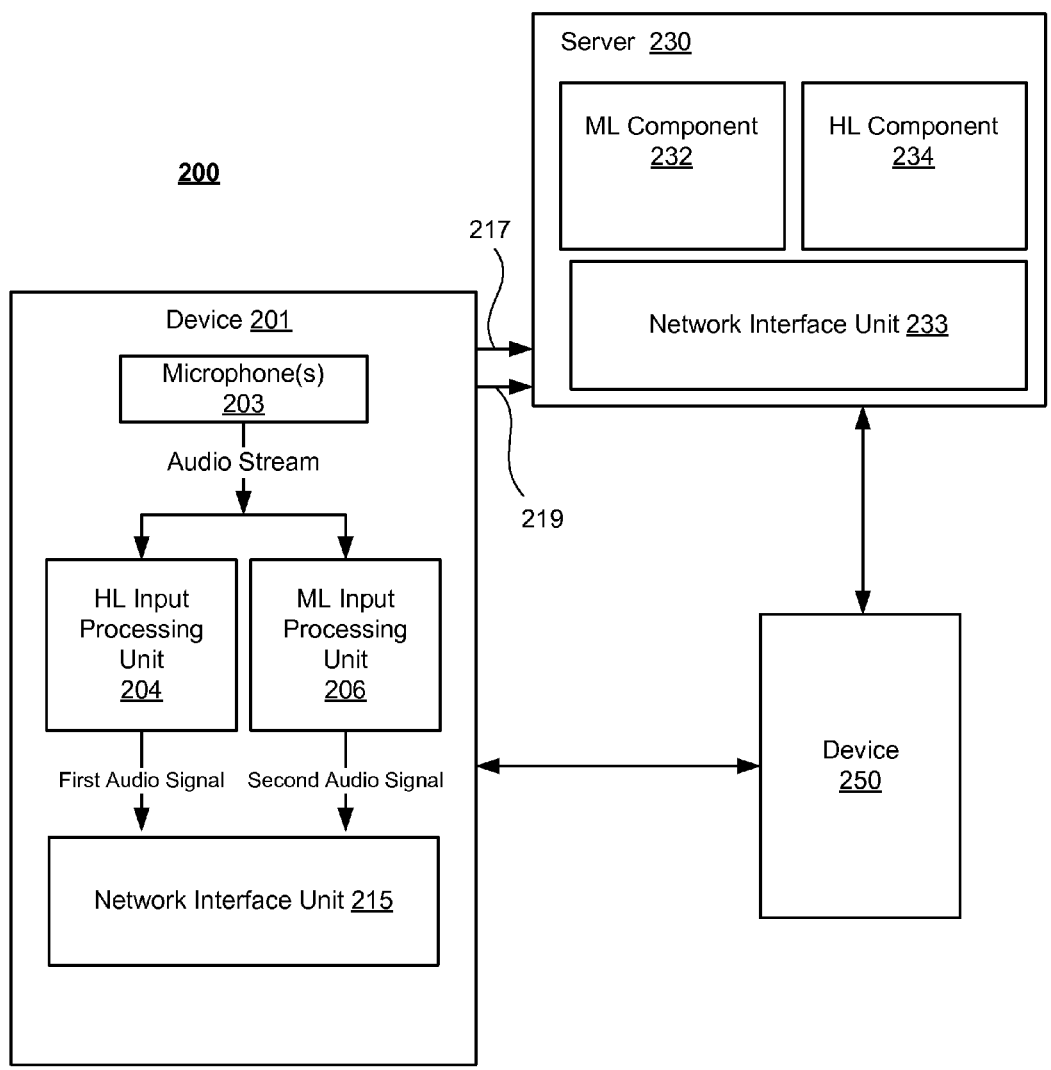
FIG. 2 illustrates a system for providing dual pre-processing of the audio stream.

FIG. 2 illustrates a system 200 for providing dual pre-processing of the audio stream according to an embodiment. The system 200 may include a device 201, a server 230, and one or more other devices 250. The device 201, the server 230, and the device 250 may exchange audio information with one another via one or more networks in manners that are commonly known.

In some embodiments, the server 230 may host one or more ML components 232, one or more HL components 234, and a network interface unit 233. The network interface unit 233 may be configured to receive the first audio signal adapted for human listening via a first uplink processing path 217 and receive the second audio signal adapted for machine listening via a second uplink processing path 219. Then, the network interface unit 233 may apply any corresponding de-compression techniques to the first and second audio signals. As explained above, the ML components 232 may represent components designed to recognize speech from a human user and perform some type of machine processing such as speech-to-text conversion or voice command interpretation. The ML components 232 may be the ML components 114 including the speech-to-text converter 115 and the voice command interpreter 117. The HL components 234 may represent components that provide the audio signals to human users such as the voice application 113 of FIG. 1A. Also, the sever 230 may include other components such as one or more processors (e.g., the at least one semi-conductor processor 108 of FIG. 1A) and non-transitory computer readable media (e.g., the non-transitory computer readable medium 110 of FIG. 1A) storing executable instructions configured to implement the functionalities and components of the server 230.

The device 201 may include a phone, smartphone, personal computer, a tablet computer, a laptop or notebook computer, a gaming device, or a thin-client terminal that can connect to a network. The device 201 may include one or more microphones 203, a HL input processing unit 204, a ML input processing unit 206, and a network interface unit 215. Although not specifically illustrated in FIG. 2, the device 201 may include HL components and ML components such as the HL components 112 and the ML components 114 as explained above with reference to FIG. 1A. Also, the device 201 may include other components such as one or more processors (e.g., the at least one semi-conductor processor 108 of FIG. 1A) and non-transitory computer readable media (e.g., the non-transitory computer readable medium 110 of FIG. 1A) storing executable instructions configured to implement the functionalities and components of the device 201.

Also, the device 201 may include an operating system configured to provide one or more services to applications (including any local HL components and/or ML components) and manage or act as an intermediary between the applications and the various hardware components of the device 201.

The microphones 203 may receive and process speech from a human user, and provide the audio stream to the HL input processing unit 204 and the ML input processing unit 206. The audio stream may represent the one or more speech signals coming from the microphones 203. If the microphones 203 include multiple microphones, the audio stream may include a collection of speech audio streams coming from the multiple microphones. Also, the device 201 may include other components for receiving audio input such as camera systems or headsets, for example. It is understood that the above are merely a few illustrative examples to which the disclosed subject matter is not limited.

The HL input processing unit 204 and the ML input processing unit 206 are the same components as the HL input processing unit 104 and the ML input processing unit 106 of FIGS. 1A and 1B. For example, the HL input processing unit 204 may be included within a first uplink processing path 217, and the ML input processing unit 206 may be included within a second uplink processing path 219. As explained above, during uplink processing, the HL input processing unit 204 may be configured to pre-process the audio stream to create a first audio signal that is adapted for human listening, and the ML input processing unit 206 may be configured to pre-process the same audio stream to create a second audio signal that is adapted for machine listening. In the example of FIG. 2, the pre-processing of the audio stream using dual-processing paths is performed locally on the device 201.

In some embodiments, the device 201 may include a network interface unit 215 that is configured to prepare the first and second audio signals for transmission to the server 230. The network interface unit 215 may allow the device 101 to be part of, and communicate via, a communications network. Examples of a Wi-Fi protocol may include, but are not limited to: Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to: IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The network interface unit 215 may be configured to establish a communication channel with the server 230 and/or the device 250 to exchange information. The network interface unit 215 may be configured to upload the first and second audio signals to the server 230 for further processing via their respective uplink processing paths. For example, the network interface unit 215 may be configured to upload the first audio signal via the first uplink processing path 217, and upload the second audio signal via the second uplink processing path 219.

The server 230 may include a computing device, such as, for example, a laptop, desktop, workstation, blade server, server, and other appropriate computers, etc. or a virtual machine or virtual computing device thereof. In various embodiments, the server 230 may include various hardware or software components that are similar or analogous to the hardware and software components described in relation to the device 201 (e.g., processor, memory, operating system, etc.).

The server 230 may be configured to receive the first audio signal and/or the second audio signal via the uplink processing paths 217, 219. Once received at the server 230, the server 230 may direct the appropriate audio signals to the appropriate components. For example, the server 230 may provide the second audio signal to the ML component 232, where the ML component 232 may be configured to process the second audio signal (e.g., speech-to-text conversion, voice command interpretation designed for machine listening). In response, depending on the context of the ML component 232, the server 230 may transmit the appropriate information back to the device 201 via a downlink communication link. For example, if the ML component 232 is embodied as the speech-to-text converter 115, the server 230 may return the machine translated text corresponding to the speech of the second audio signal. If the ML component 232 is embodied as the voice command interpreter 117, the server 230 may return the appropriate machine commands corresponding to the second audio signal for execution by the device 201.

Similarly, the network interface unit 215 may provide the first audio signal adapted for human listening over the network to the HL component 234 located on the server 230 via the first uplink processing path 217. Also, the HL components 234 may be locally provided on the device 201. In this case, if the HL component is embodied as the voice application 113, the voice application 113 may provide the first audio signal over the network to the server 230 and/or the device 250 for listening by a human user.

In some examples, the dual pre-processing paths of the system 200 may permit the ML component 232 to capture audio signals for machine listening while a user is using the HL component 234 in a manner that provides audio signals specifically tuned for human listening to the HL component 234 and provides audio signals specifically tuned for machine listening to the ML component 232. For example, the dual pre-processing paths of the system 200 may receive audio streams as the user is speaking into the microphone(s) 203. As explained above, the HL input processing unit 204 may generate first audio signals adapted for human listening, and the ML input processing unit 206 may generate second audio signals adapted for machine listening. If the HL component 234 is active, the HL component 234 provides these first audio signals to another user via the network. If the ML component 232 is active, the ML component 232 may interpret the second audio signals. As such, the dual pre-processing paths of the system 200 may permit the processing of the first audio signals by the HL component 234 and the second audio signals by the ML component 232 (which may occur at different points in time) when both the ML component 232 and the HL component 234 are active.

Figure 3:
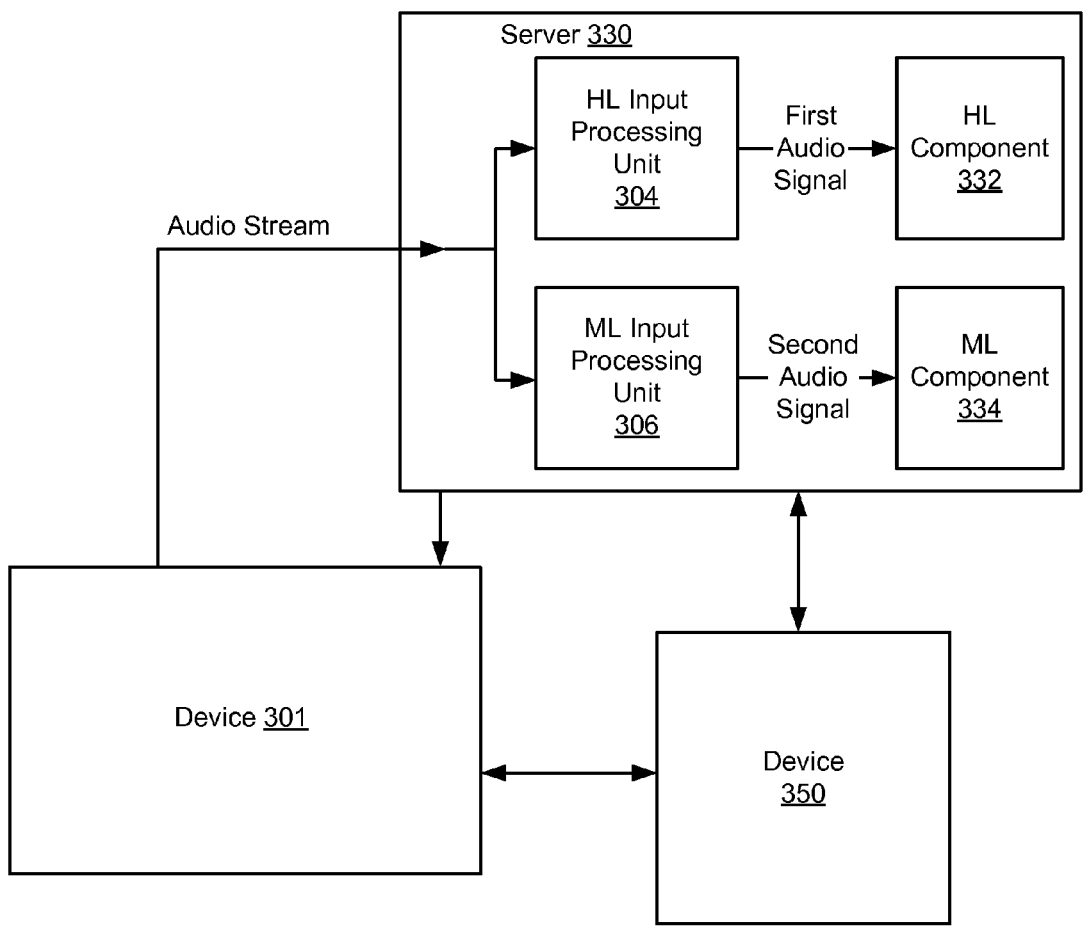
FIG. 3 illustrates a system for providing dual pre-processing of the audio stream.

FIG. 3 illustrates a system 300 for providing dual pre-processing of the audio stream according to an embodiment. The system 300 may include a device 301, a server 330, and a device 350. In this example, the dual pre-processing of the audio stream may be performed at the server 330 as opposed locally at the device 301.

The device 301 may be the same as the device 201 of FIG. 2 except that the device 301 does not include the dual pre-processing paths. The server 330 may be the same as the server 230 of FIG. 2 except that the server 330 performs the pre-processing of the audio signals. As such, the details of the device 301 and the server 330 will be omitted for the sake of brevity.

In this example, the server 330 includes the HL input processing unit 304 and the ML input processing unit 306 in order to separately pre-process the audio stream, thereby creating the first audio signal adapted for human listening and the second audio signal adapted for machine listening. In this case, instead of providing the dual processing paths locally on the device 301, the server 330 may perform the machine listening pre-processing and the human listening pre-processing on the server-side in the manner as described with reference to FIG. 1B. As such, the audio stream may be uploaded to the server 330, and the HL input processing unit 304 may pre-process the audio stream to create the first signal adapted for human listening, and the ML input processing unit 306 may pre-process the same audio stream the second signal adapted for machine listening. It is noted that the audio stream may be the speech of a human user that may be compressed. For example, device 301 may capture the audio stream from one or more microphones included on the device 301, and the device may then perform compression and other processing to prepare the audio stream for transmission. Once received at the server 230, the audio stream may be de-compressed, and then provided to the HL input processing unit 304 and the ML input processing unit 306 to create the first audio signal adapted for human listening and the second audio signal adapted for machine listening.

In some examples, the server 330 may include one or more HL components 332 and/or one or more ML components 334. The ML components 334 and the ML components 334 are the same components are previously described with reference to the previous figures, and therefore the details will be omitted for the sake of brevity. The HL input processing unit 304 may provide the first audio signal to the one or more HL components 332. The ML input processing unit 306 may provide the second audio signal to the one or more ML components 334. In some examples, the device 301 may include one or more ML components 334 and one or more HL components 332. In this example, the server 330 may transmit the first audio signal and the second audio signal to the device 301 for use in the ML components 334 and/or the HL component 332.

In some examples, the dual pre-processing paths of the system 300 may permit the ML component 334 to capture audio signals for machine listening while a user is using the HL component 332 in a manner that provides audio signals specifically tuned for human listening to the HL component 332 and provides audio signals specifically tuned for machine listening to the ML component 334. As explained above, based on the received audio stream, the HL input processing unit 304 may generate first audio signals adapted for human listening, the ML input processing unit 306 may generate second audio signals adapted for machine listening. If the HL component 332 is active, the HL component 332 provides these first audio signals to another user via the network. If the ML component 334 is active, the ML component 334 may interpret the second audio signals. As such, the dual pre-processing paths of the system 300 may permit the processing of the first audio signals by the HL component 332 and the second audio signals by the ML component 334 (which may occur at different points in time) when both the ML component 334 and the HL component 332 are active.

Figure 4:
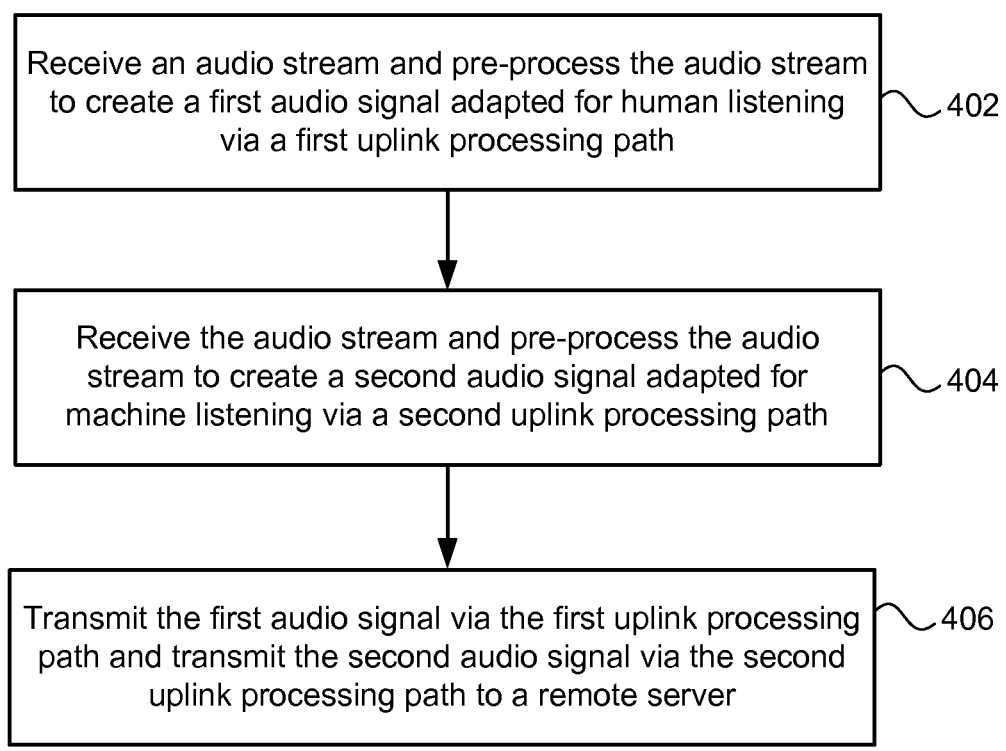
FIG. 4 illustrates a flowchart depicting example operations of the system of FIGS. 1-3.

FIG. 4 illustrates a flowchart 400 depicting example operations of the system of FIGS. 1-3 according to an embodiment. Although FIG. 4 is illustrated as a sequential, ordered listing of operations, it will be appreciated that some or all of the operations may occur in a different order, or in parallel, or iteratively, or may overlap in time.

An audio stream may be received and the audio stream may be pre-processed to create a first audio signal adapted for human listening via a first uplink processing path (402). For example, the HL input processing unit 104/204/304 (referred to as 104) may receive and pre-process the audio stream to create a first audio signal adapted for human listening. The HL input processing unit 104 may be included within a first uplink processing path. The first audio signal may be considered as one or more audio signals that have been pre-processed by the HL input processing unit 104. As such, the first audio signal may be specifically adapted or tuned for use within the HL components 112/234/332 (referred to as 112). The details of the HL input processing unit 104 are further described with reference to FIG. 1B.

The audio stream may be received and the audio stream may be pre-processed to create a second audio signal adapted for machine listening via a second uplink processing path (404). For example, the ML input processing unit 106/206/306 (referred to as 106) may receive and pre-process the same audio stream to create a second audio signal adapted for machine listening. The ML input processing unit 106 may be included within a second uplink processing path. The second audio signal may be considered as one or more audio signals that have been pre-processed by the ML input processing unit 106. As such, the second audio signal may be specifically adapted or tuned for use within the ML components 114/232/334 (referred to as 114). The details of the pre-processing algorithm that has been specifically tuned or adapted for machine listening are further explained with reference to FIG. 1B.

The first audio signal may be transmitted via the first uplink processing path to a remote server, and the second audio signal may be transmitted via the second uplink processing path (406). In one example, the network interface unit 215 of the device 201 may transmit the first audio signal via the first uplink processing path 217 to the remote server 230, and may transmit the second audio signal via the second uplink processing path 219 to the remote server 230.

Therefore, the method may include the dual uplink processing paths 102 that provide a processing path adapted for human listening and a separate pre-processing path adapted for machine listening for the uplink processing. In some embodiments, the dual uplink processing paths 102 may be parallel processing paths such that a device may process and transmit the first and second audio signals at the same time.

The HL input processing unit 104 may provide the first audio signal to the HL components 112, and the ML input processing unit 106 may provide the second audio signal to the ML components 114. In some examples, the device may upload the first audio signal and the second audio signal via the first and second uplink processing paths such that the HL components 112 and the ML components 114 of the server can receive and process the first audio signal and the second audio signal. In this context, the system 100/200/300 may apply any type of encoding/compression techniques or signal processing to adapt the first/second signals to the appropriate transmission protocols required by the networking environment of the system 100.

As explained above, in one embodiment, the ML component 114 may include the voice command interpreter 117, and the HL component 112 may include the voice application 113. The dual uplink processing paths 102 may permit the voice command interpreter 117 to capture voice commands while the user is actively using the voice application 113. For example, a user may be using the voice application 113 to communicate with another user. While the voice application 113 is active, the voice command interpreter 117 may interpret one or more second audio signals that have been specifically tuned for machine listening. In other words, the voice application 113 may process one or more first audio signals that have been tuned for human listening, while the voice command interpreter 117 may interpret one or more second audio signals that have been tuned for machine listening. It is noted that the voice application 113 and the voice command interpreter 117 are used are merely examples, where the dual uplink processing paths 102 may permit the processing of first audio signals by the HL component 112 while processing second audio signals by the ML component 114.

Figure 5:
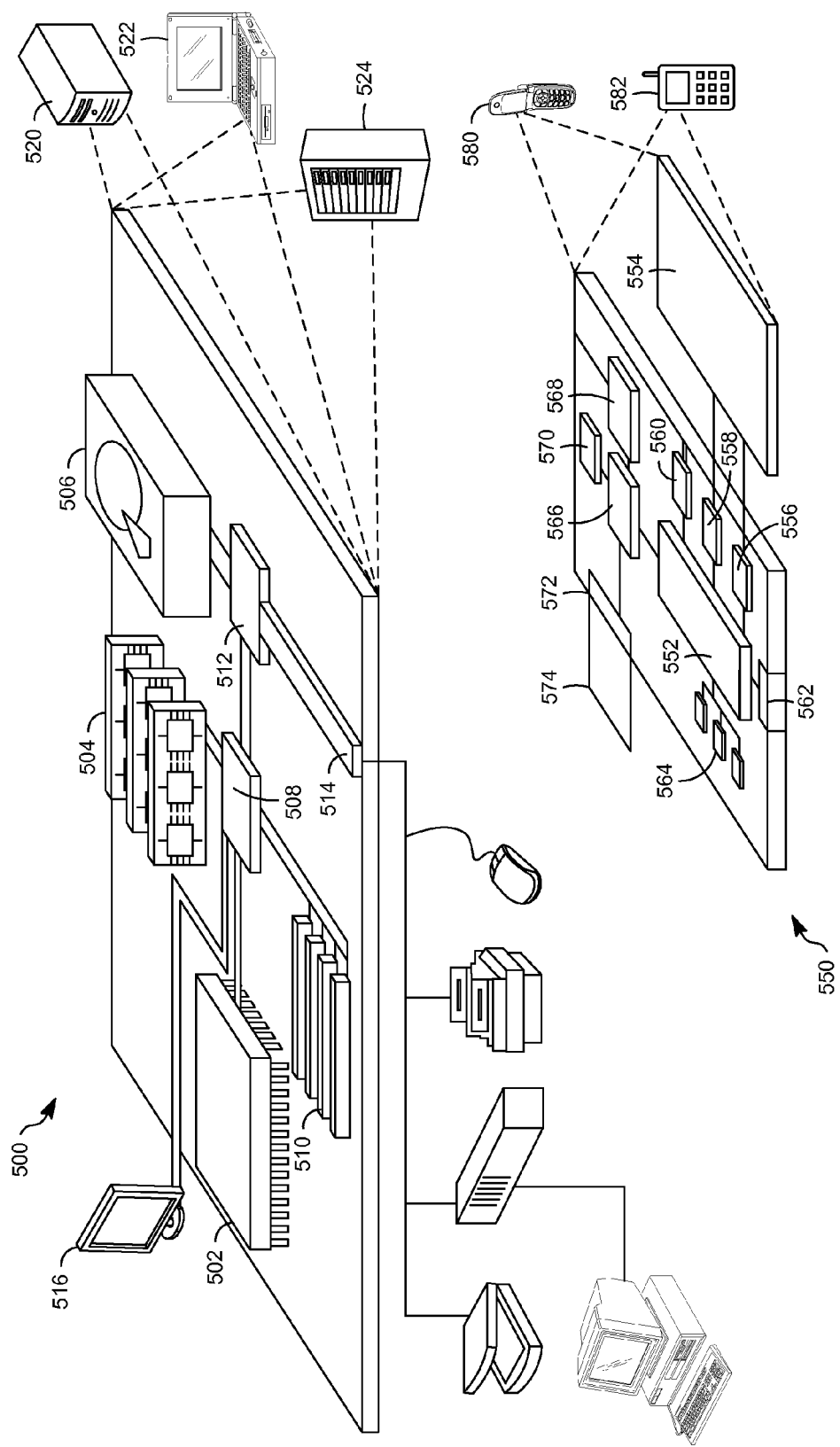
FIG. 5 is a block diagram showing example or representative devices and associated elements that may be used to implement the systems of FIGS. 1-3.

FIG. 5 is a block diagram showing example or representative devices and associated elements that may be used to implement the systems of FIGS. 1-3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A device for providing dual uplink processing paths, the device comprising:
   at least one semi-conductor processor;
   a non-transitory computer-readable medium storing instructions, when executed by the at least one semi-conductor processor, are configured to implement:
   parallel uplink processing paths including a first uplink processing path for processing and uploading audio signals adapted for human listening to at least one remote server and a second uplink processing path for processing and uploading audio signals adapted for machine listening to the at least one remote server, the first and second uplink processing paths being separate uplink communication links,
   the parallel uplink processing paths configured to receive an audio stream representing speech from a user and apply two different pre-processing algorithms separately and in parallel to generate a first audio signal adapted for human listening and a second audio signal adapted for machine listening, the two different pre-processing algorithms applying different noise reduction and compression techniques on the speech,
   the first uplink processing path configured to apply a first pre-processing algorithm to the audio stream to create the first audio signal adapted for human listening such that the first audio signal includes a non-linear gain, artifacts apart from the speech of the user, and multiple background sound levels, the second uplink processing path configured to apply a second pre-processing algorithm to the audio stream to create the second audio signal adapted for machine listening such that the second audio signal includes a linear gain and a substantially constant background sound level, the second audio signal being devoid of the artifacts of the first audio signal; and
   a network interface unit configured to concurrently and separately transmit the first audio signal and the second audio signal to the at least one remote server such that the first audio signal is transmitted via the first uplink processing path and the second audio signal is transmitted via the second uplink processing path.

2. The device of claim 1, wherein the audio stream includes a background signal level change, the background signal level change being a change in background sound levels, the first uplink processing path configured to permit the background signal level change within the first audio signal when applying the first pre-processing algorithm to the audio stream, the second uplink processing path configured to tune the background signal level change to the substantially constant background sound level within the second audio signal when applying the second pre-processing algorithm to the audio stream.

3. The device of claim 1, wherein the first uplink processing path is configured to apply the first pre-processing algorithm to create a non-linear audio signal as the first audio signal, and the second uplink processing path is configured to apply the second pre-processing algorithm to create a linear audio signal as the second audio signal.

4. The device of claim 1, wherein the first uplink processing path is configured to apply the first pre-processing algorithm to permit insertion of the artifacts into the first audio signal such that the first audio signal includes the artifacts, the second uplink processing path configured to apply the second pre-processing algorithm to block the insertion of the artifacts into the second audio signal such that the second audio signal is devoid of the artifacts inserted into the first audio signal.

5. The device of claim 1, further comprising at least one microphone configured to receive the audio stream, and provide the audio stream to the parallel uplink processing paths such that the first uplink processing path and the second uplink processing path pre-process the audio stream in parallel.

6. The device of claim 1, wherein the noise reduction techniques includes at least one of active noise control (ANC), active noise reduction (ANR), acoustic echo canceller (AES), acoustic echo supressor (AES), acoustic noise canceller (ANC), and noise suppressor (NS).

7. A method for processing an audio stream using dual pre-processing paths, the method being performed by at least one semi-conductor processor, the method including:
   providing parallel uplink processing paths including a first uplink processing path for processing and uploading audio signals adapted for human listening to at least one remote server and a second uplink processing path for processing and uploading audio signals adapted for machine listening to the at least one remote server, the machine listening including speech-to-text conversion, the first and second uplink processing paths being separate uplink communication links;
   receiving an audio stream representing speech from a user;
   applying two different pre-processing algorithms separately and in parallel to generate a first audio signal adapted for human listening and a second audio signal adapted for machine listening, the two different pre-processing algorithms applying different noise reduction techniques on the speech when a bandwidth of the audio stream is decreased, the applying including, applying a first pre-processing algorithm to the audio stream in the first uplink processing path to create the first audio signal adapted for human listening such that the first audio signal includes a non-linear gain, artifacts apart from the speech of the user, and multiple background sound levels, applying a second pre-processing algorithm to the audio stream in the second uplink processing path to create the second audio signal adapted for machine listening such that the second audio signal includes a linear gain and a substantially constant background sound level, the second audio signal being devoid of the artifacts of the first audio signal; and concurrently and separately transmitting the first audio signal and the second audio signal to the at least one remote server such that the first audio signal is transmitted via a first uplink processing link and the second audio signal is transmitted via a second uplink processing link.

8. The method of claim 7, wherein the audio stream includes a background signal level change, the background signal level change being a change in background sound levels, the applying the first pre-processing algorithm to the audio stream in the first uplink processing path to create the first audio signal adapted for human listening includes permitting the background signal level change within the first audio signal, and the applying the second pre-processing algorithm to the audio stream in the second uplink processing path to create the second audio signal adapted for machine listening includes tuning the background signal level change to the substantially constant background sound level within the second audio signal.

9. The method of claim 7, wherein the applying the first pre-processing algorithm to the audio stream in the first uplink processing path to create the first audio signal adapted for human listening includes creating a non-linear audio signal as the first audio signal, and the applying the second pre-processing algorithm to the audio stream in the second uplink processing path to create the second audio signal adapted for machine listening includes creating a linear audio signal as the second audio signal.

10. The method of claim 7, wherein the applying the first pre-processing algorithm to the audio stream in the first uplink processing path to create the first audio signal adapted for human listening includes permitting insertion of the artifacts into the first audio signal such that the first audio signal includes the artifacts, and the applying the second pre-processing algorithm to the audio stream in the second uplink processing path to create the second audio signal adapted for machine listening includes blocking the insertion of the artifacts into the second audio signal such that the second audio signal is devoid of the artifacts inserted into the first audio signal.

11. A non-transitory computer-readable medium storing executable instructions, when executed by at least one semi-conductor processor, are configured to:

provide parallel uplink processing paths including a first uplink processing path for processing and uploading server audio signals adapted for human listening to at least one remote server and a second uplink processing path for processing and uploading audio signals adapted for machine listening to the at least one remote server, the machine listening includes voice command recognition, the first and second uplink processing paths being separate uplink communication links;

receive an audio stream representing speech from a user via at least one microphone;

apply two different pre-processing algorithms separately and in parallel to generate a first audio signal adapted for human listening and a second audio signal adapted for machine listening, the two different pre-processing algorithms applying different noise reduction and suppression techniques on the speech, including, apply a first pre-processing algorithm to the audio stream in the first uplink processing path to create the first audio signal adapted for human listening such that the first audio signal includes a non-linear gain, artifacts apart from the speech of the user, and multiple background sound levels, apply a second pre-processing algorithm to the audio stream in the second uplink processing path to create the second audio signal adapted for machine listening such that the second audio signal includes a linear gain and a substantially constant background sound level, the second audio signal being devoid of the artifacts of the first audio signal; and concurrently and separately transmit the first audio signal and the second audio signal to the at least one remote server such that the first audio signal is transmitted via the first uplink processing path and the second audio signal is transmitted via the second uplink processing path.

12. The non-transitory computer-readable medium of claim 11, wherein the audio stream includes a background signal level change, the background signal level change being a change in background sound levels, the executable instructions to apply the first pre-processing algorithm to the audio stream in the first uplink processing path to create the first audio signal adapted for human listening includes executable instructions to permit the background signal level change within the first audio signal, and the executable instructions to apply the second pre-processing algorithm to the audio stream in the second uplink processing path to create the second audio signal adapted for machine listening includes executable instructions to tune the background signal level change to the substantially constant background sound level within the second audio signal.

13. The non-transitory computer-readable medium of claim 11, wherein the executable instructions to apply the first pre-processing algorithm to the audio stream in the first uplink processing path to create the first audio signal adapted for human listening includes executable instructions to create a non-linear audio signal as the first audio signal, and the executable instructions to apply the second pre-processing algorithm to the audio stream in the second uplink processing path to create the second audio signal adapted for machine listening includes executable instructions to create a linear audio signal as the second audio signal.

14. The non-transitory computer-readable medium of claim 11, wherein the executable instructions to apply the first pre-processing algorithm to the audio stream in the first uplink processing path to create the first audio signal adapted for human listening includes executable instructions to permit insertion of the artifacts into the first audio signal such that the first audio signal includes the artifacts, and the executable instructions to apply the second pre-processing algorithm to the audio stream in the second uplink processing path to create the second audio signal adapted for machine listening includes executable instructions to block the insertion of the artifacts into the second audio signal such that the second audio signal is devoid of the artifacts inserted into the first audio signal.

15. A device comprising:
   at least one semi-conductor processor;
   a non-transitory computer-readable medium storing instructions, when executed by the at least one semi-conductor processor, are configured to implement:
   parallel uplink processing paths including a first uplink processing path for processing and uploading audio signals adapted for human listening to at least one remote server and a second uplink processing path for processing and uploading audio signals adapted for machine listening to the at least one remote server, the machine listening being associated with a speech-to-text conversion application, the human listening being associated with a voice application, the first and second uplink processing paths being separate uplink communication links,
   the parallel uplink processing paths configured to receive an audio stream representing speech from a user and apply two different pre-processing algorithms in parallel to generate a first audio signal adapted for human listening and a second audio signal adapted for machine listening, the two different pre-processing algorithms applying different noise reduction techniques on the speech when a bandwidth of the audio stream is decreased,
   the first uplink processing path configured to apply a first pre-processing algorithm to the audio stream to create the first audio signal adapted for human listening such that the first audio signal includes a non-linear gain, artifacts apart from the speech of the user, and multiple background sound levels, the second uplink processing path configured to apply a second pre-processing algorithm to the audio stream to create the second audio signal adapted for machine listening such that the second audio signal includes a linear gain and a substantially constant background sound level, the second audio signal being devoid of the artifacts of the first audio signal; and
   a network interface unit configured to concurrently and separately transmit, over a network, the first audio signal and the second audio signal to the at least one remote server such that the first audio signal is transmitted via the first uplink processing path and the second audio signal is transmitted via the second uplink processing path,
   the network interface unit configured to receive, over the network, text information of the speech of the user corresponding to the second audio signal from the at least one remote server while the voice application is actively processing the first audio signal.

16. The device of claim 15, wherein the audio stream includes a background signal level change, the background signal level change being a change in background sound levels, the first uplink processing path configured to permit the background signal level change within the first audio signal when applying the first pre-processing algorithm to the audio stream, the second uplink processing path configured to tune the background signal level change to the substantially constant background sound level within the second audio signal when applying the second pre-processing algorithm to the audio stream.

17. The device of claim 15, wherein the first uplink processing path is configured to apply the first pre-processing algorithm to create a non-linear audio signal as the first audio signal, and the second uplink processing path is configured to apply the second pre-processing algorithm to create a linear audio signal as the second audio signal.

18. The device of claim 15, further comprising at least one microphone configured to receive the audio stream, and provide the audio stream to the parallel uplink processing paths such that the first uplink processing path and the second uplink processing path pre-process the audio stream in parallel.

19. The device of claim 15, wherein the first uplink processing path is configured to apply the first pre-processing algorithm to permit insertion of the artifacts into the first audio signal such that the first audio signal includes the artifacts, the second uplink processing path configured to apply the second pre-processing algorithm to block the insertion of the artifacts into the second audio signal such that the second audio signal is devoid of the artifacts inserted into the first audio signal.

\* \* \* \* \*